W. A. DOBLE.
CONTROLLING MECHANISM.
APPLICATION FILED JAN. 18, 1910.

994,505.

Patented June 6, 1911.
2 SHEETS—SHEET 2.

Witnesses

Inventor
William A. Doble
By
Foster, Freeman, Watson & Coit
Attorneys

UNITED STATES PATENT OFFICE.

WILLIAM A. DOBLE, OF SAN FRANCISCO, CALIFORNIA, ASSIGNOR TO MAY E. DOBLE, OF SAN FRANCISCO, CALIFORNIA.

CONTROLLING MECHANISM.

994,505.  Specification of Letters Patent.  Patented June 6, 1911.

Application filed January 18, 1910. Serial No. 538,645.

*To all whom it may concern:*

Be it known that I, WILLIAM A. DOBLE, a citizen of the United States, and resident of San Francisco, county of San Francisco, State of California, have invented certain new and useful Improvements in Controlling Mechanisms, of which the following is a specification.

This invention relates to controlling mechanism of the type in which a controlled member is arranged to be connected to a plurality of controlling members which may be hand or power operated.

This invention is particularly applicable to water wheels for the purpose of regulating the speed of the wheel, which in impact water wheels is accomplished by controlling the discharge of the nozzle. Where the speed of the water wheel is controlled by controlling the nozzle, this may be accomplished by moving the nozzle bodily so as to direct the stream against or away from the buckets on the wheel, or the discharge may be regulated by means of a regulating needle. The above regulating means are shown in my prior Patents 926,055, granted June 22, 1909, and 660,789, granted October 30, 1900.

Where the water wheel is large considerable power is required to operate the regulating means, and in view of the fact that some positive form of clutch must be used to clutch the controlling members to the controlled member, considerable power is required to shift the clutch out of engagement due to the frictional resistance between the engaging faces of the clutch, and between the shiftable member and the controlled shaft.

The object of this invention is, therefore, to construct a controlling mechanism in which the clutches may be readily shifted, and in which frictional resistance will be eliminated.

The invention will be described in connection with the accompanying drawings, in which—

Figure 1:
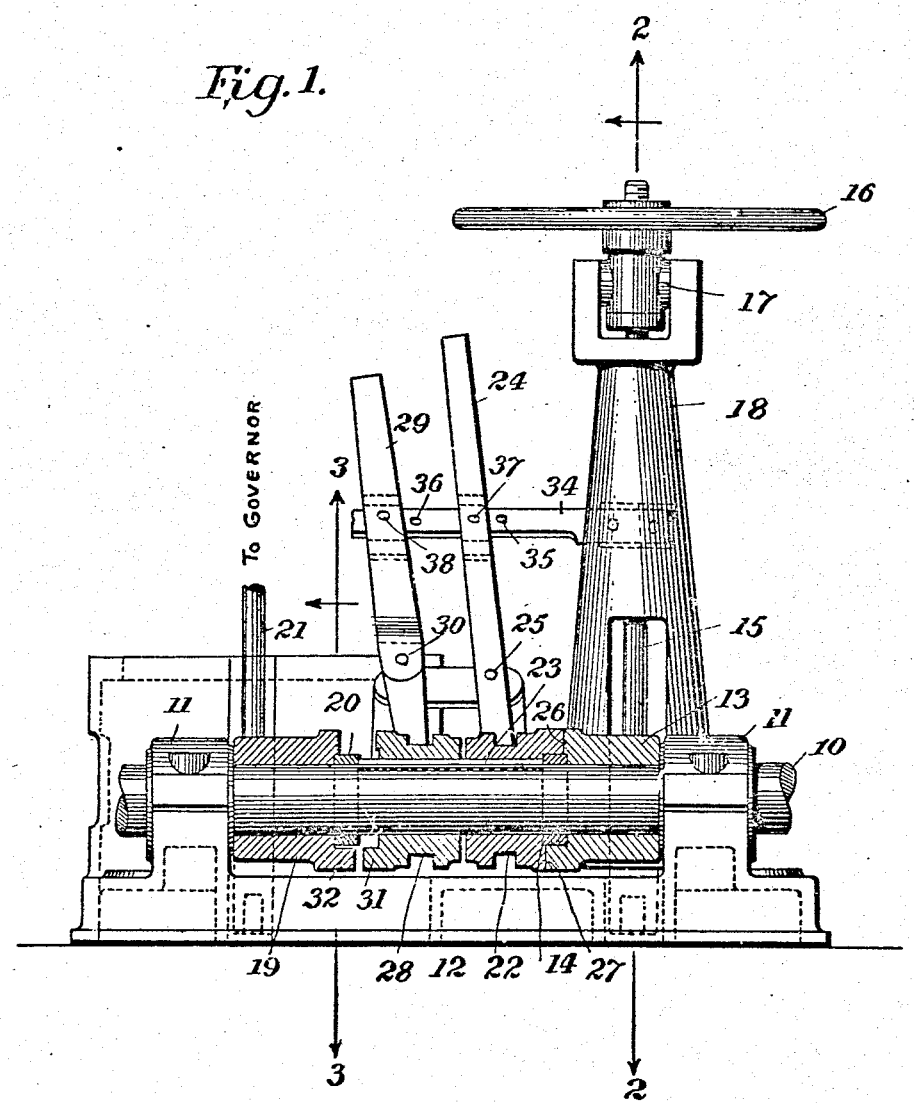
Figure 2:
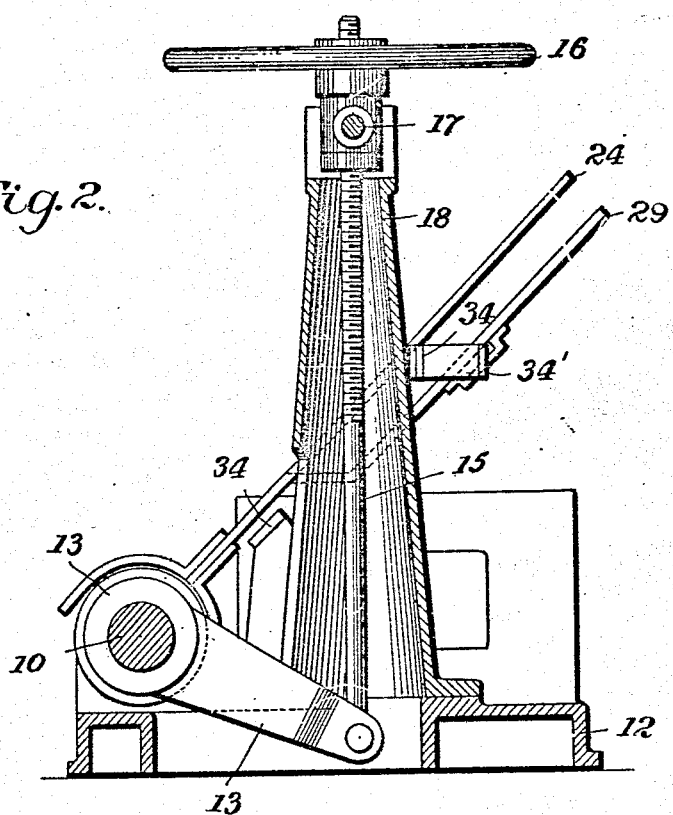
Figure 3:
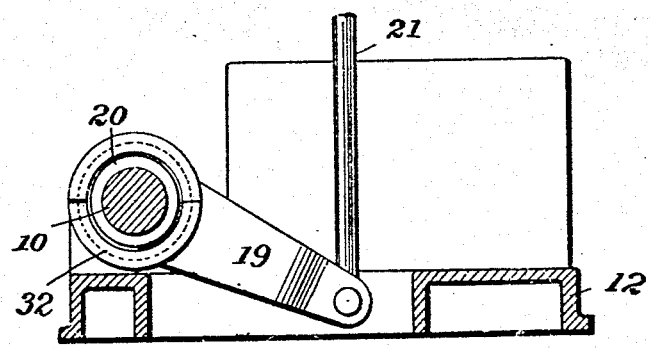

Figure 1 is a longitudinal section through the controlled shaft and the parts mounted thereon; Fig. 2 is a section on the line 2—2 Fig. 1, and Fig. 3 is a section on the line 3—3 Fig. 1.

Referring to the drawings, 10 designates a controlled member, which in this case is a shaft mounted in bearings 11 on a base plate 12. This shaft 10 is arranged to be connected to the member which is to be controlled, for instance, it may be connected to the mechanism for moving the nozzle, or to the needle for regulating the discharge of the water from the nozzle in the patents referred to. It is, however, to be understood that this invention is not to be limited to the specific uses mentioned, but may be used generally.

The shaft 10 has loosely mounted upon it an arm 13, which is restrained from endwise movement by means of the bearing 11 and a collar 14 rigidly connected to the shaft. A rod 15 is pivotally connected at one end to the arm 13, the other end being threaded and extending through a threaded collar on the hand wheel 16, the hand wheel and collar being mounted for rotation in a support mounted to turn on trunnions 17 in bearings on a hollow stand 18. Another arm 19 is loosely mounted upon the shaft 10, and restrained from endwise movement by means of the bearing 11 and a collar 20, rigidly connected to the shaft. The end of the arm is pivotally connected to a rod 21, which leads to a suitable governor, so that the arm 19 is arranged to be moved and operated by the governor.

A sliding clutch member 22 is splined on the shaft 10 by means of a key 23, and is arranged to be shifted longitudinally by means of a handle 24 pivoted at 25 on the base plate 12. The clutch member 22 and the arm 13 form two members of a claw coupling, each being provided with suitable interlocking jaws 26 and 27. A second clutch member 28 is splined on the shaft and arranged to be shifted by means of a handle 29 pivoted at 30 on the base plate. The member 28 and the arm 19 similarly form two members of a claw coupling, the engaging faces being provided with interlocking jaws 31 and 32. As will be seen by reference to Fig. 1, the clutch members 22 and 28 are of such length and so related to each other that both cannot be out of operative engagement with the arms 13 and 19 at the same time. A suitable bracket is secured to the stand 18 and provided with an arm 34, which has formed therein a number of holes 35, and the handle 24 is provided with a coöperating hole 37 so that the handle 24 may be locked in a plurality of positions by inserting a pin through the coöperating holes. Another arm 34' extends from the bracket and is provided with a plurality of holes 36, which coöperate with a hole 38 in the handle 29, the holes in the handle and arm being arranged to receive a pin to lock the handle in position.

The controlled shaft 10 will bear the entire weight etc. of the mechanism which is to be controlled; for instance, the entire weight of the nozzle, where the nozzle is the member which is to be shifted. Referring to the position of the parts as shown in Fig. 1, it will be seen that there will be a large frictional resistance between the coöperating jaws 26 and 27, and also between the clutch member 22 and the key 23. Therefore, if the member which is to be controlled is large a great amount of power will be required to shift the clutch member 22 out of engagement with the arm 13. If an attempt be made to shift 22 while the entire pressure is on 22 and 13, it will be necessary to resort to heavy reducing gearing, and in such cases the wear on the parts of the coupling will be great. In order to obviate the disadvantages which would follow if it were necessary to shift the clutch member 22 out of engagement with the arm 13 while the pressure on the shaft 10 is transmitted to the clutch member, this mechanism has been designed so that the pressure on the clutch member may be relieved.

The operation will now be described.

In the drawings the shaft 10 is shown as coupled with the manually controlling member 13. It will also be seen that the clutch members are independently shiftable on the shaft. If it is desired to couple the shaft with the governor controlling member 19, the procedure is as follows: The clutch member 28 is shifted to the left by means of the handle 29 and the governor is operated in any suitable manner so as to shift the arm 19 until the jaws 31 and 32 are brought into alinement and engagement. The arm 19 is then rotated still further until the pressure on the shaft 10 is taken up by the arm 19, and in this way the pressure on the clutch member 22 is relieved, and thus this clutch member may be easily shifted out of clutching position, since practically all friction has been eliminated. Similarly, when it is desired to shift the controlled shaft from the governor to the hand controlled member, the procedure is just the reverse from the above. It will, therefore, be seen that this invention provides an arrangement in which the pressure on the clutching member which is to be disengaged is relieved, and the frictional resistance to its movements eliminated before said member is shifted, the pressure of the shaft being shifted to and taken up by the other clutching member. It will also be seen that the other clutch member is thrown into engagement when it is in a position so that there will be no frictional resistance to its shifting movements. In this way the handles 24 and 29 may be readily operated, since only a small amount of power is required for their operation.

It is obvious that various changes may be made in the details of construction without departing from this invention, and it is, therefore, to be understood that this invention is not to be limited to the specific construction shown and described.

What I claim is:

1. The combination with a controlled member, of a plurality of controlling members, means for clutching one of said controlling members with said controlled member and for unclutching another of said controlling members from said controlled member, and for relieving the pressure on said clutching means so as to eliminate frictional resistance.

2. The combination with a controlled member, of a plurality of controlling members, a clutch for each of said controlling members arranged to independently clutch said controlling members with said controlled member, and means whereby the pressure on said clutches may be relieved so as to eliminate frictional resistance to their movements.

3. The combination with a controlled member, of a plurality of controlling members, a clutch for each of said controlling members arranged to independently clutch said controlling members with said controlled member, and means whereby the pressure on one of said clutch members may be relieved and transferred to another clutch member, so as to eliminate frictional resistance to the movement of the relieved clutch member.

4. The combination with a controlled shaft, of a plurality of controlling members, clutching means sliding on said shaft and arranged to clutch said controlling members with said shaft, and means whereby the pressure of said shaft on said clutching means, due to the turning moment of said shaft, may be relieved so as to eliminate frictional resistance to the movement of said clutching means on said shaft.

5. The combination with a controlled shaft, of a plurality of controlling members, a plurality of independent clutches sliding on said shaft and arranged to independently clutch said shaft with said controlling members, and means whereby the pressure of said shaft on one of said clutches, due to the turning moment of said shaft, may be relieved and transferred to another clutch, so as to eliminate frictional resistance to the sliding movement of the relieved clutch.

6. The combination with a controlled shaft, of a plurality of controlling members turning loosely on said shaft, a plurality of independent clutches sliding on said shaft and arranged to independently clutch said shaft with said controlling members, and means whereby the pressure of said shaft on one of said clutches, due to the turning moment of said shaft, may be relieved and transferred to another clutch, so as to eliminate frictional resistance to the sliding movement of the relieved clutch.

7. The combination with a controlled shaft, of a plurality of controlling arms turning loosely on said shaft and having clutch faces, a plurality of independent clutches sliding on said shaft and having clutch faces arranged to coöperate with the clutch faces on said arms so as to independently clutch said shaft with said arms, and means whereby the pressure of said shaft on one of said clutches, due to the turning moment of said shaft, may be relieved and transferred to another clutch, so as to eliminate frictional resistance to the sliding movement of the relieved clutch.

8. The combination with a controlled member, of governor and manual controlling members, means for clutching and unclutching either one of said controlling members with said controlled member, and means whereby the pressure on said clutching means may be relieved so as to eliminate frictional resistance.

9. The combination with a controlled member, of governor and manual controlling members, a clutch for each of said controlling members arranged to independently clutch said controlling members with said controlled member, and means whereby the pressure on one of said clutch members may be relieved and transferred to another clutch member, so as to eliminate frictional resistance to the movement of the relieved clutch member.

10. The combination with a controlled shaft, of a plurality of controlling arms turning loosely on said shaft, one of said arms being governor operated, a hand wheel connected to the other arm, a pair of independent clutches sliding on said shaft and arranged to independently clutch said shaft to said arms, a pair of hand levers mounted adjacent said hand wheel to operate said clutches, and means whereby the pressure of said shaft on one of said clutches, due to the turning moment of said shaft, may be relieved and transferred to another clutch, so as to eliminate frictional resistance to the sliding movement of the relieved clutch.

11. The combination with a controlled shaft, of a plurality of controlling members turning loosely on said shaft, a plurality of independent sliding clutches arranged to independently clutch said shaft with said controlling members, the structure being such that both clutches cannot be out of operative engagement with their controlling members at the same time.

12. The combination with a controlled shaft, of a plurality of controlling arms turning loosely on said shaft and having clutch faces, a plurality of independent clutches sliding on said shaft between said arms and having clutch faces arranged to coöperate with the clutch faces on said arms so as to independently clutch said shaft with said arms, the said clutches being so related that both cannot be out of engagement with their arms at the same time.

In testimony whereof I affix my signature in presence of two witnesses.

WILLIAM A. DOBLE.

Witnesses:
FREDERICK GFELLER,
LEOPOLD M. KARNASCH.